US008849518B2

(12) United States Patent
Nefcy et al.

(10) Patent No.: US 8,849,518 B2
(45) Date of Patent: Sep. 30, 2014

(54) METHOD AND SYSTEM FOR AUTOMATIC WHEEL POSITIONING

(75) Inventors: Barney D. Nefcy, Novi, MI (US); Marvin Paul Kraska, Dearborn, MI (US); Walt Joseph Ortmann, Saline, MI (US); Brian 'Ninja' Soo, Farmington Hills, MI (US); Dan Scott Colvin, Farmington Hills, MI (US); David Tourner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 499 days.

(21) Appl. No.: 12/775,477

(22) Filed: May 7, 2010

(65) Prior Publication Data

US 2011/0276225 A1 Nov. 10, 2011

(51) Int. Cl.
*B62D 6/00* (2006.01)
*G08G 1/16* (2006.01)
*B62D 15/02* (2006.01)

(52) U.S. Cl.
CPC .............. *B62D 15/027* (2013.01); *G08G 1/168* (2013.01)
USPC .................................. 701/45; 701/36; 701/41

(58) Field of Classification Search
CPC .................................................. B62D 15/0285
USPC ....................................... 701/41, 23; 180/443
See application file for complete search history.

(56) References Cited

U.S. PATENT DOCUMENTS

| 5,931,252 | A | * | 8/1999 | Shimizu et al. | 180/204 |
|---|---|---|---|---|---|
| 7,295,227 | B1 | * | 11/2007 | Asahi et al. | 348/118 |
| 7,378,988 | B2 | * | 5/2008 | Nordbruch | 340/932.2 |
| 7,894,951 | B2 | * | 2/2011 | Norris et al. | 701/36 |
| 2001/0025210 | A1 | * | 9/2001 | Tozu et al. | 701/1 |
| 2002/0198644 | A1 | * | 12/2002 | Obata et al. | 701/41 |
| 2005/0273236 | A1 | * | 12/2005 | Mori et al. | 701/41 |
| 2006/0089770 | A1 | * | 4/2006 | Ito | 701/41 |
| 2008/0154464 | A1 | * | 6/2008 | Sasajima et al. | 701/42 |
| 2009/0259365 | A1 | * | 10/2009 | Rohlfs et al. | 701/41 |

FOREIGN PATENT DOCUMENTS

| JP | 2004322855 A | * | 11/2004 | B62D 6/00 |
|---|---|---|---|---|
| JP | 2007237838 A | * | 9/2007 | |

OTHER PUBLICATIONS

Tajima et al., JP2004322855A Steering Control Device—machine translation, Nov. 18, 2004.*
Yokote et al., JP2007237838A Steering Device, Automobile, and Steering Control Method—machine translation, Sep. 20, 2007.*

* cited by examiner

*Primary Examiner* — Calvin Cheung
*Assistant Examiner* — Lail Kleinman
(74) *Attorney, Agent, or Firm* — Joseph E. Root

(57) ABSTRACT

A system and method for automatically angularly positioning wheels of an automotive vehicle after parking. The system disclosed here includes a power-assisted steering system coupled to the wheels. Further, the system includes a controller, coupled to the steering system, which is configured to automatically position the wheels in a desired direction, based on a determination that the vehicle is parked.

15 Claims, 3 Drawing Sheets

METHOD AND SYSTEM FOR AUTOMATIC WHEEL POSITIONING

BACKGROUND

This application relates generally to the field of vehicle steering systems and more particularly to automatic steering system during parking.

Hybrid vehicles, typically, utilize two or more energy sources to increase fuel economy. One of the energy sources employed in hybrid vehicles is a high voltage battery which can be charged from the engine using liquid fuel or by capturing regenerative braking energy during driving. Most vehicles employ a power steering system to assist drivers in maneuvering the vehicle at low speeds. The power steering system is usually powered by the engine (during turned 'ON' state) and is not operable when the engine is turned off. Electrically powered steering systems, however can be operated even when the engine is turned off, using an electrical energy supply. One such power steering system is the EPAS (Electric Power Assist Steering) installed in certain automobiles (including hybrid vehicles) provided by the Ford Motor Company. Other automobiles may contain similar electric power steering system known to those skilled in the art. The electric power steering system help promote fuel efficiency with an ability to reduce load on the electrical system during no-use times.

The electric power assist steering system may be coupled to a number of assistance modules, providing additional features to a vehicle. One such module is parking assistance that renders capabilities such as auto-parking, parallel parking, and so on to a vehicle, resulting in a convenient or completely automatic parking process. Parking on a slope, however, may require extra vigilance. Typically, while parking on a steep slope a parking brake or a parking pawl is applied to avoid rolling. On a steep slope, however, the parking brake and the parking pawl may sometimes fail, resulting in damages.

Conventionally, as a safety precaution, while parking next to a curb, drivers turn the front wheels toward the road curb when parking on a slope. Whether parked uphill or downhill, turning the front wheels to the curb results in bringing the vehicle to a halt at the curb instead of rolling down the slope, in case the parking brake or pawl fails. This safety precaution, however, is manual, which introduces a number of problems. For example, the driver may simply forget to turn the wheels, or the driver may not be aware of this safety precaution. Moreover, this precaution can only be practiced by a driver who is educated enough to understand the need to turn the front wheels towards the curb.

Additionally, in automobile showrooms, the front wheels of a vehicle are typically turned at an angle for a better aesthetic appeal. Some users may choose to turn their front wheels after parking, for showcase purposes. In such situations, it may be preferred to always park a vehicle with wheels turned. However, presently, a driver has to manually maneuver the steering wheel to turn the front wheels off center.

It would be highly desirable to have an automatic and cost-effective solution for vehicles that ensure wheel positioning after parking.

SUMMARY

One embodiment of the present application describes a system for automatically angularly positioning wheels of an automotive vehicle, having an electric power-assisted steering system. The system includes a controller, coupled to the steering system, which is configured to identify a parked state of the vehicle. Based on an identification that the vehicle is parked, the controller transfer a signal to the steering system, resulting in positioning the wheels in a desired direction.

Another embodiment of the present application discloses a method for automatically angularly positioning the wheels after parking. The method includes turning off the ignition of the vehicle, in order to park the vehicle. In case a manual input is received from a driver, the method includes transmitting a signal to position the wheels based on the manual input. In case no manual input is received, the method identifies road curb in close proximity of the wheels, and transfers a signal to position the wheels towards on the identified road curb. Finally, the wheels are positioned in the desired direction based on the signal received. Further, when engine is turned on, the wheels are repositioned to the original position.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a method and system for automatically positioning a vehicle's wheels after parking. The wheel positioning mechanism described in this disclosure is generally applicable to various types of vehicles including small or large cars, trucks, vans, SUVs, and trailers. More particularly, the wheel positioning mechanism may be used in vehicles employing electric power assist steering systems. After parking a vehicle on a gradient or linear surface, the wheel positioning mechanism sends appropriate signals to automatically position the wheels. This capability rendered by the wheel positioning mechanism not only provides safety features to a vehicle parked on a gradient surface, but also facilitates showroom look preferred by some users.

Exemplary Operating Environment

Figure 1:
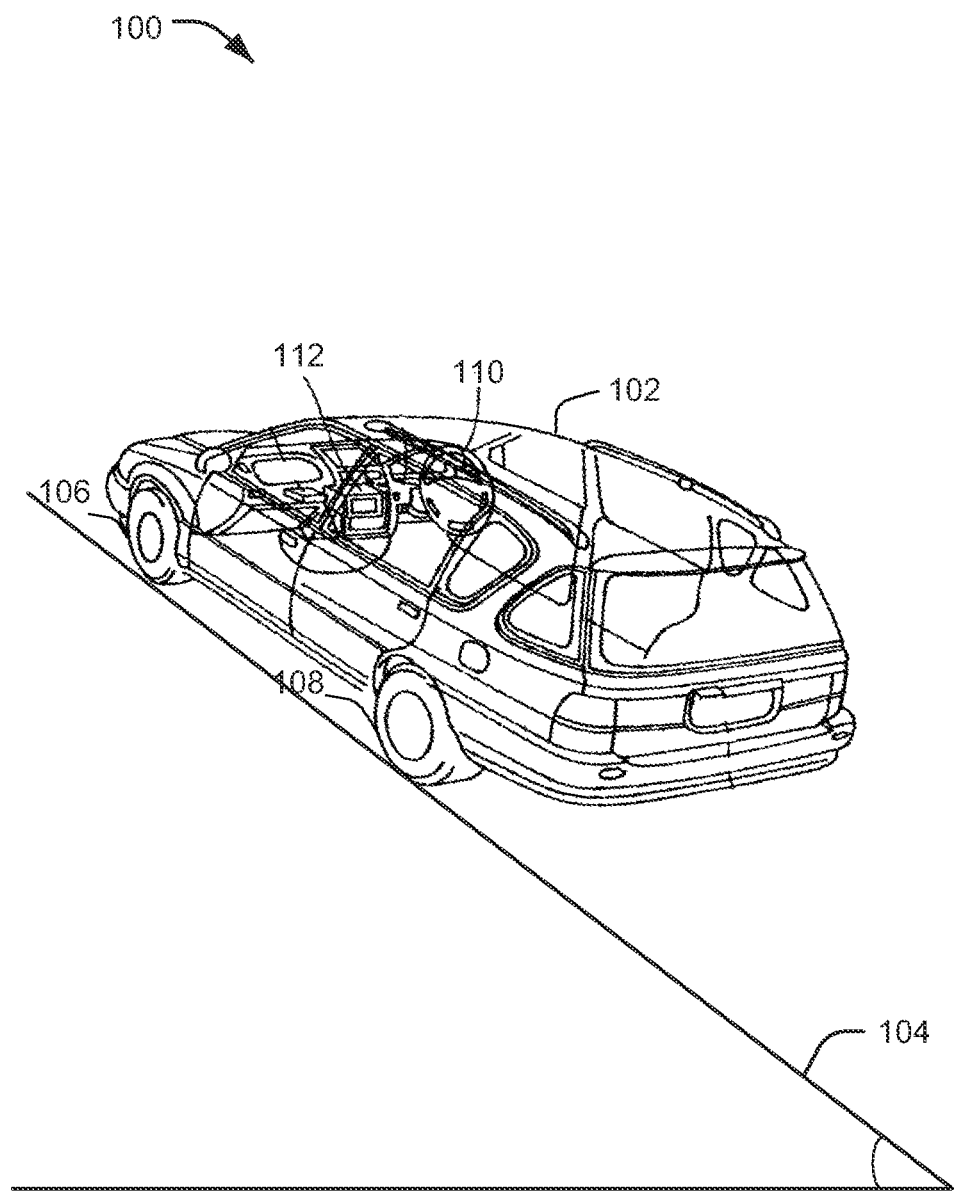
FIG. 1 is an exemplary embodiment of a system illustrating a vehicle parked on a slope.

FIG. 1 illustrates an exemplary environment 100 within which the teachings of the present disclosure may operate. The environment 100 depicts a conventional automotive vehicle 102 parked on a slope 104. Those skilled in the art will appreciate that other environments including, but not limited to, a vehicle parked on a level ground may also be anticipated.

The vehicle 102 includes a set of wheels—a pair of front wheels 106, and a pair of rear wheels 108, a steering system 110, and a controller 112, controlling the functionalities of the vehicle 102. The steering system 110 may include any known electric power-assisted steering systems, which provides power assisted steering, and the steering system 110 may operate even when the ignition is turned off. The vehicle 102 can be a hybrid or a non-hybrid vehicle, equipped with a number of capabilities, known to those skilled in the art.

The controller 112 may include a conventional vehicle controller employed to render a number of capabilities, facilitating convenient driving. Parking assistance, grade detector, obstacle sensors, position sensors, parallel parking are some of the features that may be provided by the controller 112. For example, using the parking assistance system, the vehicle 102 can steer itself into a parking space with little or no input from the driver. The controller 112 is coupled to the steering system 110 to provide such parking assistance. Such systems are useful while parking on the slope 104 as well. It should be appreciated by those skilled in the art that these features are known and will not be discussed in the details in this disclosure.

The present disclosure uses the current capabilities rendered by the controller 112, coupled to the steering system 110, to provide a safety feature, while parking the vehicle 102 on the slope 104. This safety precaution will be explained in the following section in connection with FIGS. 2 and 3.

Exemplary Embodiments

Figure 2:
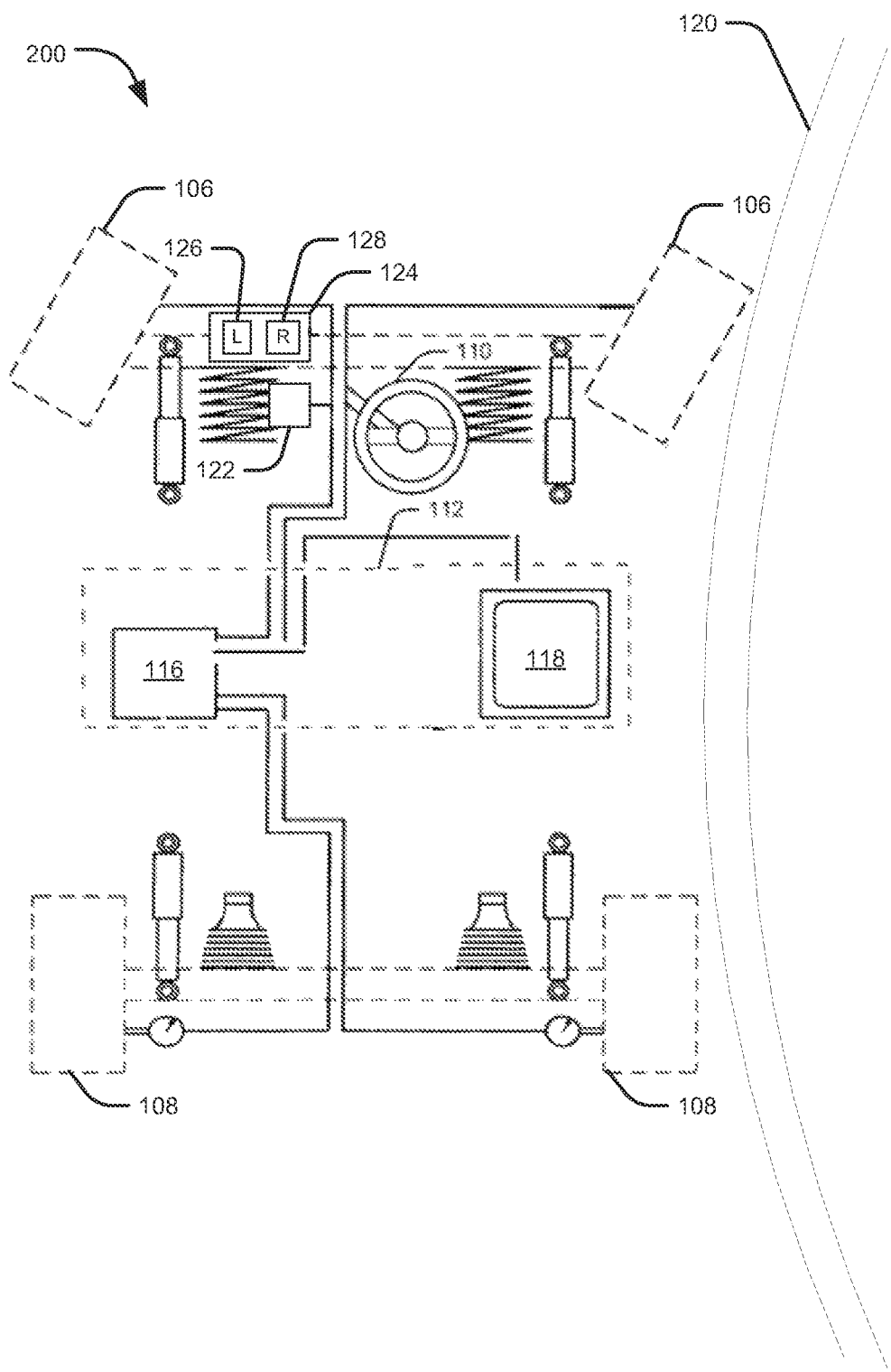
FIG. 2 illustrates an exemplary embodiment of a system providing automatic wheel positioning after parking.

FIG. 2 illustrates an exemplary embodiment of a system 200 providing automatic angular wheel positioning after parking. The system 200 may be operating on the exemplary environment 100 depicted in FIG. 1; however, those skilled in the art will appreciate that other environments for implementing the system 200 can be anticipated.

As shown in FIG. 2, the vehicle 102 is parked on a surface, such as the slope 104, or a non-gradient surface. The vehicle 102 includes the steering system 110 coupled to the controller 112. To provide convenient driving features, the controller 112 includes a grade detector 116, and a curb detector 118. It should be apparent that the controller 112 is shown with only two modules for purposes of description, however a conventional controller employed in a hybrid vehicle may include a number of other modules to provide assistance.

Moreover, the system 200 illustrates the vehicle 102 parked close to a road curb 120, which is the edge where a raised pavement, sidewalk, footpath, road median, or road shoulder meets a street or roadway. To render the advantages of the current disclosure, the system 200 uses an electric power-assisted steering system, such as EPAS (Electric Power Assist Steering) 122, coupled to the steering system 110. In general, an EPAS is designed to use an electric motor to reduce effort by providing steering assist to the driver of a vehicle. The electric motor generates assist torque or force, which reduces the required hand wheel force or steering wheel torque, facilitating convenient driving. Further, the electric motor may keep the EPAS functional for wheel maneuvering even when the engine is turned off.

As discussed in the background section, while parking next to a curb on an inclined surface, a driver turns the front wheels off-center, towards the road curb, resulting in prevention of damages. The manual steering of the wheels, however, may be cumbersome and a driver, in most cases, may not remember to turn the wheels to the curb.

To avoid such situations, the system 200 provides a means to automatically steer the front wheels 106 towards the curb 120, after parking. Once the vehicle 102 is parked, the system 200 sends commands or signals to the EPAS 122 to automatically turn the wheels 106. The EPAS 122 may receive the signals or commands to turn the wheels 106 through two sources—manual input or automatic.

In case of manual initiation, a driver can provide inputs resulting in curbing of the wheels 106, once the vehicle 102 is parked. The driver may specify the wheel turning direction through a manual interface 124. As shown in FIG. 2, the manual interface 124 includes buttons 126 and 128, specifying a left and a right direction respectively. The amount of angular rotation of the wheels 106 from the center position is pre-calculated, determined during manufacturing, and stored in memory (not shown in FIG. 2). The driver may press the left button 126 or the right button 128 to provide the desired direction, and the decision to rotate to the left or the right is determined by the driver based on experience or education. Upon receiving the manual input provided by the driver, the controller 112 sends out commands to the EPAS 122 to turn the wheels 106 in the specified direction. As a result, the steering of the wheels 106 towards the curb 120 is implemented with minimal manual input. In other implementations, the manual interface 124 may include switches, touchpad screen, to indicate left or right direction. In another implementation of the present disclosure, vehicle's key fob may contain buttons or switches specifying left or right direction, and by pressing any of these buttons after parking the vehicle 102, appropriate signals may be transferred to the EPAS 122 for wheel maneuvering. Such an implementation utilizes the power source attached with the EPAS 122 to accomplish wheel maneuvering, after parking.

The manual input to position the wheels 106 may not depend on the gradient of the road or the position of the curb 120. As discussed above, for showcase purposes, the driver may provide the manual input to turn the wheels 106 irrespective of the grade of the road. Further, the manual input may either specify a particular direction, or simply initiate wheel positioning and the orientation of the wheels 106 may be determined automatically by the controller 112. The process of automatically identifying an appropriate orientation of the wheels 106 will be discussed in the following sections.

In case of automatic initiation, the EPAS 122 may receive commands to turn the wheels 106 automatically with no manual input. Once the vehicle 102 is parked, the controller 112 identifies whether the vehicle 102 is parked on a gradient using the grade detector 116. In case a gradient is identified, the controller 112 identifies a situation that requires wheel positioning. Next, using the curb detector 118, the controller 112 identifies the road curb 120 in closest proximity of the front wheels 106. The curb detector 118 may include devices such as sensors, obstacle detectors, or other such devices known to those skilled in the art. In an embodiment of the system 200, parking assistance module, detectors, sensors, and other assistance devices employed by a conventional vehicle, such as the vehicle 102, may include capabilities of determining the gradient and the curb. In such situation, the controller 112 may receive inputs directly from these devices.

Based on the identified road curb 120, the controller 112 transfers commands to the EPAS 122 to maneuver the wheels 106 towards the curb 120. The command transferred by the controller 112 includes information to angularly orient the wheels 106 to the left or the right. The angle of orientation may also be specified. The angle of orientation may be calibrated during the vehicle manufacturing process, for example. This calibration process may be empirically determined from experimentation, calculations based on steepness of the slope, vehicle specifications such as weight, length, available power, temperature, or using other parameters known to those skilled in the art. In case no specific orientation angle is available, the controller 112 may send out signals to completely turn the wheels 106 in either a left or right direction.

In an implementation of the system 200, the controller 112 may be configured to commence the wheel positioning process with an identification that the vehicle 102 is parked next to a curb. In such a configuration, the controller 112 may or may not employ the grade detector 116. The inputs to the EPAS 122, however, are essentially based on the position of the road curb 120.

The controller 112 may also be configured to automatically position the wheel after parking, in all situations, regardless of the curb location or grade of the surface. As discussed in the background, some users may prefer to showcase their vehicle's wheels in a parked state. In showrooms, typically, for aesthetic appearance, the front wheels of a vehicle are angularly turned off the center position. To facilitate wheel positioning in such situations, the controller 112 may automatically transfer commands to the EPAS 122, once the vehicle 102 is parked. In certain situations, the orientation of the wheels 106 may be determined by the controller 112 based on the curb identification. In other situations, the controller 112 may specify any desired direction of wheel positioning. With such a configuration, locking the vehicle 102 with a key, or remote device, turning off the ignition are some of the situations that may trigger automatic wheel positioning.

In another embodiment of the system 200, if the grade detector 116 senses a level ground, no manual input is received from a driver, and with no automatic settings of the controller 112, the EPAS 122 may not receive any signal to position the wheels 106. In such a situation, the vehicle 102 is parked with wheels 106 positioned parallel to the longitudinal axis of the vehicle 102 or in whichever condition the driver left the wheels 106 while parking.

Once the wheels 106 are positioned in an appropriate direction, the EPAS 122 may be turned off. Further, the controller 112 may also be configured to automatically transfer commands to EPAS 122 for repositioning the wheels 106 to their center position, once the vehicle 102 is no more in the parked state or upon receiving an input from the driver.

For purposes of clarity, the application of the system 200 will be described in an example set out here. Consider the vehicle 102 equipped with EPAS 122 and a parking assist module, such as parallel parking module, which enables parallel parking the vehicle 102 in line with other parked vehicles, all vehicles being parked parallel to the curb 120. Parallel parking system is well known to those skilled in the art and will not be explained in detail here.

It should be understood that while using the parallel parking module, the controller 112 identifies the parking position of the vehicle 102 and the position of the road curb 120. Moreover, the sensors employed in such a system may be able to identify the slope of the road. With this system in place, using curb identification and slope detection, the controller 112 can automatically turn the wheels 106 towards the curb 120, once the vehicle 102 is parked. As discussed, the known functionalities of the parallel parking module are employed to provide an appropriate command to the EPAS 122 for wheel positioning. Additionally, a remote locking key for the vehicle 102 may include two buttons specifying left and right direction, through which the driver may initiate the wheel positioning in the desired direction, once parked. Upon receiving a signal or a command from the controller 112, the EPAS 122 operates to steer the wheels 106 towards the curb 120. Among other examples, a vehicle equipped with detectors and sensors may also be embedded with the system 200 to enable automatic wheel positioning after parking.

As a result, the present disclosure renders capabilities of automatically positioning front wheels of a vehicle, initiated manually or automatically. If a manual option is desired, then a user may simply specify the direction to position the wheels, and the steering of the wheel is implemented automatically using the manual input. An automatic system, however, would position the wheels in a particular direction, upon a determination that the vehicle is parked, based on a number of parameters as discussed in reference to FIG. 2.

Figure 3:
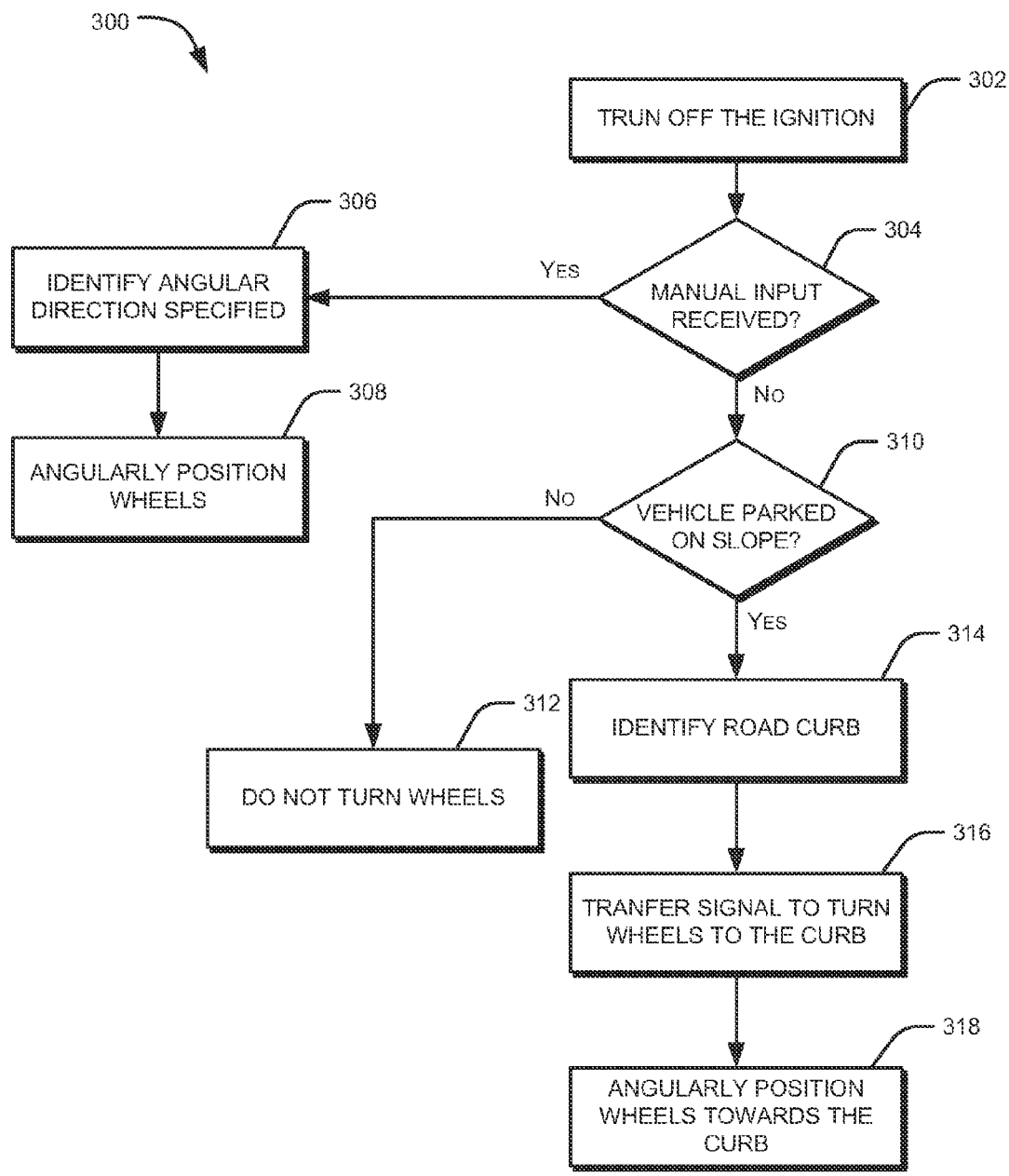
FIG. 3 outlines a flow chart illustrating an exemplary embodiment of a method to automatically position vehicle wheels after parking.

FIG. 3 outlines a method 300 for carrying out the subject matter of the disclosure. The method 300 includes steps 302 to 318 describing a process for automatically angularly positioning a vehicle's front wheel after parking, with minimal or no manual input. The method 300 is explained in reference to FIGS. 1 and 2, however, those skilled in the art will appreciate that other environments or systems may be anticipated for implementation of the method 300.

The method 300 starts at step 302, where, the ignition of the vehicle 102 is turned off, referred to as a parked state of the vehicle 102. Once the vehicle 102 is parked, to provide safety precaution on a slope or for showcase purposes, a driver may opt to angularly position the wheels 106 of the vehicle 102. As a result, at step 304, the controller 112 identifies whether a manual input to position the wheels 106 is received.

In case a manual input is received, at step 306, the method 300 includes identifying the angular direction of positioning the wheels 106, as specified by the driver. In most cases, the angular direction specified may be left or right, and the angle of rotation may be calibrated while manufacturing the vehicle 102. Next, at step 308, the steering system 110 maneuvers the wheels 106 in the specified direction. The controller 112 identifies the direction specified by the driver and transfers corresponding signal to the EPAS 122, which in turn controls the steering system 110, in order to position the wheels 106 in the desired direction. In an embodiment of the method 300, the driver may simply specify that the wheels 106 need to be turned, while the orientation may not be specified. In such a situation, the controller 112 identifies the position of the road curb 120, as discussed in FIG. 2, to determine the appropriate direction. Subsequently, the controller 112 transfers signals to the steering system 110 to position the wheels 106 in the determined direction.

In case no manual input is received, the method 300 identifies the gradient of the road, at step 310. As discussed in FIG. 2, the grade detector 116 employed by the controller 112 determines whether the vehicle 102 is parked on a slope. If the vehicle 102 is not parked on a slope, at step 312, the method 300 determines that wheel positioning may not be required, resulting in parking the vehicle 102 with wheels 106 positioned parallel to the longitudinal axis of the vehicle 102.

If the vehicle 102, however, is parked on a slope, the method 300 identifies the road curb 120, at step 314. The curb detector 118 as discussed with FIG. 2 may operate to identify the road curb 120 in closest proximity of the front wheels 106. The road curb 120 acts as a barrier to avoid rolling of the vehicle 102 parked on a slope, in case of brake failure.

To leverage this advantage of the road curb 120, at step 316, the controller 112 transfer signals for angularly turning the wheels 106 towards the curb 120. The signals or commands include information about the direction of wheel positioning, amount of angular rotation to be provided to the wheels 106, and so on. The controller 112 transfers these commands to the EPAS 122. Finally, at step 318, the EPAS 122 maneuvers the steering system 110 to positions the wheels 106 based on the signal received at the step 316.

The method 300 also includes turning off the EPAS 122 once the wheels 106 are positioned in the desired direction. Further, the EPAS 122 repositions the wheels 106 once the method 300 identifies non-parked state of the vehicle 102.

It will also be evident to those skilled in the art that though FIG. 3 illustrates the methods 300 for automatically positioning the front wheels 106 of the vehicle 102, this method 300 may also be used to automatically position the real wheels 108, or a combination of the front wheels 106 and the rear wheels 108, without departing from the scope of the present disclosure.

Those skilled in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the disclosure, which is determined solely by reference to the appended claims.

CONCLUSION

The present disclosure provides a mechanism for automatically maneuvering the vehicle wheels after parking, embodying the following advantages. The device and the methods enable easy and convenient positioning of the wheels for vehicle parked on a slope, providing safety features to avoid rolling. Accordingly, the vehicle is prevented from severe damages. Moreover, the disclosure provides convenient features to showcase vehicle wheels after parking. As the wheel positioning occurs automatically or by receiving minimum inputs from a user, the disclosure reduces human intervention to minimal.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A system for angularly positioning the wheels of an automotive vehicle having a power-assisted steering system, after parking the vehicle, the system comprising:
    a controller coupled to the steering system, wherein the controller is configured to:
    identify a parked state of the vehicle;
    on identifying the parked state, the controller being further configured to receive a manual input from a driver, including:
        in response to determining the manual input is received from a driver, directing the controller to position the wheels of the vehicle in a specific direction, then commanding the steering system to position the wheels in the specific direction;
        in response to determining the manual input is not received from the driver, then upon identifying that the vehicle is parked on a slope and that a road curb exists in proximity to the wheels of the vehicle, then commanding the steering system to position the wheels toward the road curb;
    wherein the wheels are positioned at a predetermined angular orientation, the angular orientation being based on one or more of the steepness of the slope, vehicle specifications, or ambient temperature.

2. The system of claim 1, wherein the signal to the steering system angularly rotates the wheels in a right or a left direction.

3. The system of claim 1, wherein the wheels are the front wheels of the vehicle.

4. The system of claim 1, wherein the controller further includes a grade detector for identifying whether the vehicle is parked on a slope.

5. The system of claim 4, wherein the controller is configured to transfer the signal to the steering system automatically based on a determination that the vehicle is parked on a slope.

6. The system of claim 1, wherein the controller includes a curb detector configured to identify the position of road curb in close proximity of the wheels.

7. The system of claim 6, wherein the controller is configured to transfer the signal for automatically angularly positioning the wheels towards the road curb.

8. The system of claim 1, wherein the controller is configured to transfer the signal to the steering system through a manual input.

9. The system of claim 8, wherein the manual input includes one or more of an angular direction in which the wheels should be rotated, and the extent of rotation for the wheels.

10. The system of claim 1, wherein the controller is further configured to reposition the wheels based on a determination that the vehicle is no more in the parked state.

11. A method for automatically angularly positioning vehicle wheels after parking, the method comprising:
    upon a determination by a controller that a vehicle ignition has been turned off, initiating the method by the controller;
        in response to determining a manual input is received from a driver directing the controller to position the wheels in a specified angular commanding a power-assisted steering system to position the wheels in the specified direction;
        in response to determining no manual input is received from the driver, then upon identifying that the vehicle is parked on a slope and that a road curb exists in proximity to the wheels of the vehicle, commanding the steering system to position the wheels towards the curb;
    wherein, the wheels are positioned at a predetermined angular orientation, the angular orientation being based on one or more of the steepness of the slope, vehicle specifications, or ambient temperature.

12. The method of claim 11, wherein the positioning step includes automatically positioning the wheels.

13. The method of claim 11 further includes repositioning the wheels upon a determination that the ignition is turned on.

14. The method of claim 11, wherein the identifying step further includes determining the grade of the surface.

15. The method of claim 14, wherein the transmitting step includes transmitting the signal based on a determination by a sensor that the vehicle is parked on a slope.

* * * * *